April 3, 1945.  J. W. HOBBS  2,372,781
SEALING DEVICE
Filed Sept. 5, 1942  2 Sheets-Sheet 1
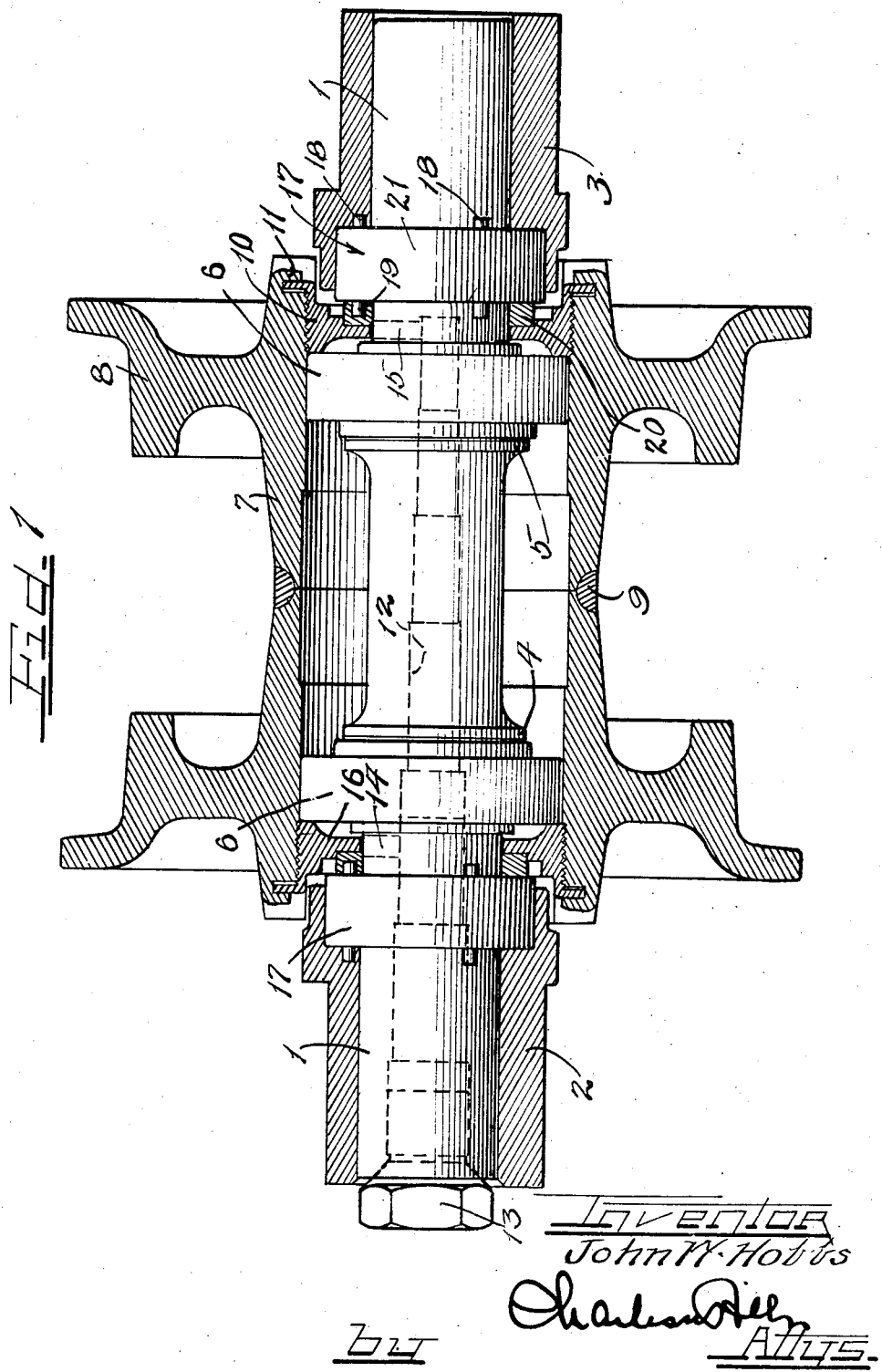
Inventor
John W. Hobbs
by Charles ? Attys.

April 3, 1945.   J. W. HOBBS   2,372,781
SEALING DEVICE
Filed Sept. 5, 1942   2 Sheets-Sheet 2
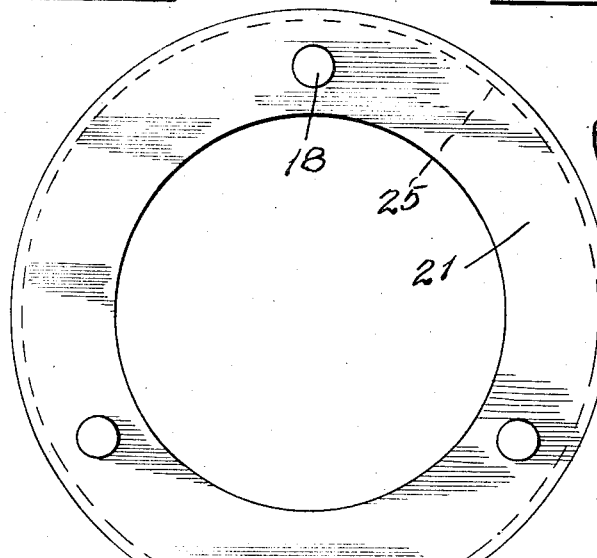
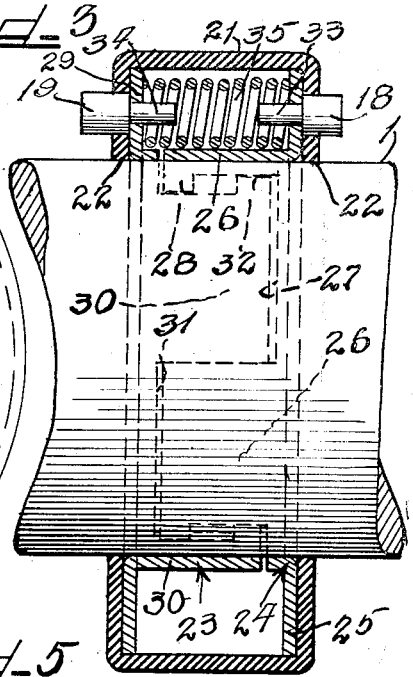
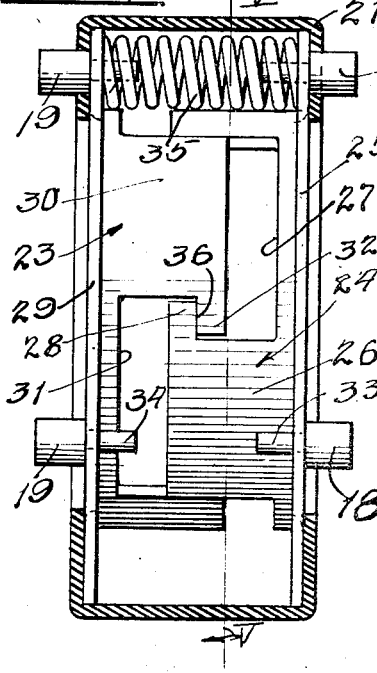
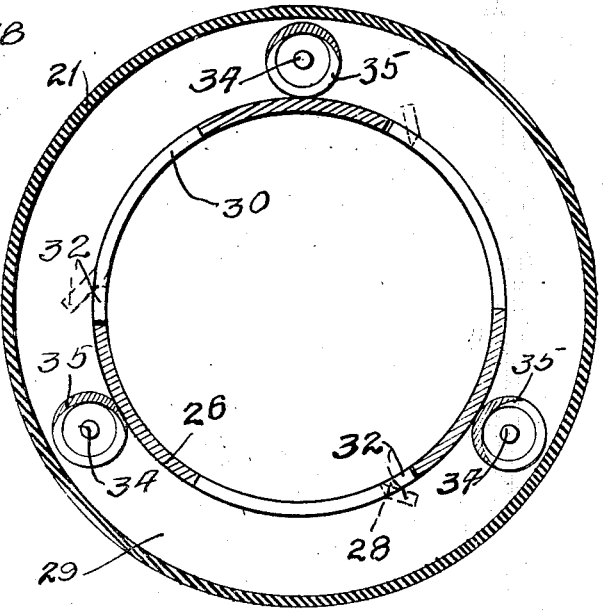
Inventor
John W. Hobbs Patented Apr. 3, 1945

2,372,781

UNITED STATES PATENT OFFICE 2,372,781

SEALING DEVICE

John W. Hobbs, Springfield, Ill., assignor to John W. Hobbs Corporation, Springfield, Ill., a corporation of Illinois Application September 5, 1942, Serial No. 457,397

1 Claim. (Cl. 286—11)

This invention relates to improvements in a sealing device, and more particularly to a sealing device in the nature of a packing ring for disposition about a shaft to prevent the escape of lubricant from bearings associated with the shaft, although the device may have other uses and purposes as will be apparent to one skilled in the art.

In the past, difficulty has been experienced in properly sealing in lubricant around bearings, especially where the entire apparatus is subjected to extremely rough usage, such as occurs in the operation of trucks, tractors, tanks, and the like. It frequently happened in connection with such mechanism, especially where a caterpillar tread was used, that the lubricant would have entirely left the bearings after a relatively short interval of use or operation.

With the foregoing in mind, it is an important object of the instant invention to provide a sealing device arranged for placing in position under compression, and to provide only what may be termed edge contact with the shaft, thus effecting a more positive seal.

Another object of the invention resides in the provision of a ring type sealing device disposable around the shaft, and arranged so as to provide only a minimum of surface contact with the shaft, so that there will be very little wear upon the sealing device, even though the shaft rotates relatively to the device.

Another feature of the invention resides in the provision of a sealing device arranged for positioning around a shaft with the sealing device itself arranged to provide pressure upon the sealing medium proper and thus augment the sealing action of the sealing medium.

Still another object of the invention is the provision of a sealing device in the nature of a retainer arrangement for disposition around a shaft, the device being so constructed as to be axially yieldable so that it may be mounted under pressure, the means providing the yielding resistance interiorly of the device being entirely concealed and affecting in no manner whatsoever the mounting of the device in position.

Still a further object of the invention resides in the provision of a sealing device in the nature of a retaining ring construction which is fabricated of several pieces so arranged as to provide a resistance to axial compression of the device, but the entire construction being made in the form of a unit that may be manipulated and handled as though it were one single integral piece.

A further object of the invention is the provision of a sealing device which is highly positive in its sealing action, extremely durable, and economical to both make and use.

It is also a feature of this invention to provide a novel method of making a sealing device.

While some of the more salient features, characteristics and advantages of the instant invention have been above pointed out, others will become apparent from the following disclosures, taken in conjunction with the accompanying drawings, in which:

Figure 1 is a fragmentary part sectional, part elevational view of a wheel mounting for a caterpillar tread, the mounting including sealing devices embodying principles of the instant invention;

Figure 2 is an enlarged side elevational view of one of the sealing devices embodied in the structure of Figure 1;

Figure 3 is an enlarged fragmentary vertical sectional view of the sealing device of Figure 2 in position on a shaft, the shaft being shown in elevation, and parts of the sealing device being shown in elevation;

Figure 4 is an edge elevational view of the sealing device seen in Figures 2 and 3, with the covering boot shown in section, the device being seen in its expanded condition, removed from a shaft;

Figure 5 is an enlarged transverse sectional view through the sealing device taken substantially as indicated by the line V—V of Figure 4, looking in the direction of the arrows, and indicating in dotted lines my novel method of making the sealing device.

As shown on the drawings:

The illustrated embodiment of the instant invention is shown in association with an idler wheel mounting for a caterpillar tread, such as may be incorporated in a tractor, tank, or the like, in Figure 1 of the drawings. This idler wheel mounting or assembly includes a stationary shaft 1 carried in a pair of end supporting bearings 2 and 3, the shaft being provided with integral flanged portions 4 and 5 spaced apart and disposed at an intermediate region of the shaft. Against each of the flanged portions 4 and 5 is a roller bearing assembly 6 which carries an idler wheel or pulley 7 equipped with suitable caterpillar tread engaging lugs 8. The idler wheel is preferably put on in two sections which are joined together after mounting by a suitable seal 9. A suitable bearing holding collar 10 is provided on the outside of each bearing 6, and has an upstanding flange engaged by one or more holding lugs 11 struck inwardly from the pulley 7.

Since the pulley 7 rotates under heavy load on the bearings 6—6, suitable lubricant must at all times be supplied to the bearings. To this end, the shaft is provided with an interior step-down bore 12 closed at the outer end by a suitable plug 13. Lubricant may be provided under pressure to the bore 12, and passed to each of the bearings through radial channels 14 and 15 in the shaft. Each of the channels 14 and 15 communicates with the arcuate wall 16 of the adjacent collar 10 so that the lubricant under pressure may pass along this curved wall 16 and enter the roller bearing assemblies 6—6. It is naturally desirable to prevent loss of lubricant between the shaft 1 and the supporting bearings 2 and 3. To this end, a sealing device embodying improvements of the instant invention is mounted in the structure outside of each of the bearing assemblies 6—6.

Such sealing device is generally indicated by reference numeral 17, and the sealing device has a plurality of studs extending therefrom on each side. In the illustrated instance there are three such studs 18 on one side, and a similar number of studs 19 on the opposite side. The studs 19 fit in suitable sockets in a washer 20 abutting an inwardly extending flange on the adjacent collar member 10, and the studs 18 seat in suitable recesses in the adjacent supporting bearings 2 or 3 as the case may be. When so mounted in position, the sealing device is preferably under axial compression, that is the device is actually squeezed axially between the washer 20 and the adjacent supporting bearings 2 or 3. Such squeezing action, as will more fully later appear herein, augments the sealing function of the device, and the device is internally constructed to provide a reactive outward pressure against the axial compression.

With reference now to Figures 2, 3 and 4 it will be seen that the sealing device is in the nature of a retainer ring, and is enclosed within a boot or casing 21, preferably of resilient material, which functions as the sealing medium proper. This boot may be made of any suitable material, such, for example, as synthetic rubber, a material known as "neoprene" being a satisfactory substance.

As seen best in Figures 3 and 4, the boot is of channel shape and the sides of the channel are provided with suitable apertures through which the studs 18 and 19 extend. As seen best in Figure 3, when the sealing device is mounted in position on the shaft 1, the resilient boot 21 has what may be termed edgewise engagement with the shaft as indicated at 22 on each side of the sealing device. Such edgewise engagement, especially when the sealing device is under an axial compression, provides an exceedingly positive seal against the leakage of lubricant along the outer surface of the shaft. It will also be especially noted that such edgewise engagement provides only a minimum surface contact of the sealing medium with the shaft so that there will be extremely little wear upon the sealing medium in the event the shaft 1 rotates relatively to the sealing device.

Interiorly thereof the sealing device comprises a pair of complemental half portions, that is a left half portion and a right half portion of similar construction. These portions are generally indicated by numeral 23 for the left half portion and 24 for the right half portion.

The right half portion 24 includes a radial flange 25 extending outwardly from an integral body portion 26 which is of substantially cylindrical construction for telescopic engagement with the shaft 1. The body portion 26 is provided with a plurality of relatively large apertures 27 spaced therearound. In the illustrated instance there will be three such apertures in the body portion. One side wall of each aperture is free of obstruction and parallels the axis of the device. A lug 28 extends circumferentially on the other side wall of the aperture, as seen best in Figure 4, thus defining an open neck portion leading into the opening or aperture 27 which neck is definitely narrower than the main part of the opening.

The left half portion or member 23 is of complemental and similar construction, including a radial flange 29, a cylindrical body portion 30, a series of relatively large apertures 31 in the body portion, and a lug 32 extending circumferentially from one of the side walls of each of the apertures to provide a narrower neck portion leading axially into the aperture.

With reference to Figure 4, it will be seen that the lugs 28 on the right half portion 24, and the lugs 32 on the left half portion 23 overlap each other and are normally in edge to edge contact when the sealing device is not mounted in operative position. The solid body portions 30 of the left member extend into the openings 27 in the right member, and likewise the solid body portions 26 of the right member extend into the openings 31 of the left member. The lugs 28 and 32, while permitting axial movement of the side members toward each other to the depth of the openings 27 and 31, do not permit an axial separation of the members beyond the position seen in Figure 4, due to the edgewise abutment of the lugs with each other.

Each of the studs 18 on the radial flange 25 is provided with a reduced shank 33 extending through to the inside of the flange. Likewise, each of the studs 19 on the radial flange 29 of the left member is provided with a reduced shank 34 extending inwardly from that flange. With reference again to Figures 3 and 4, it will be seen that the studs 18 and 19 are directly oppposite each other so that oppositely disposed shanks 33 and 34 provide a suitable mounting means for a compression spring 35. In the illustrated instance, there are three such compression springs disposed equidistantly around the sealing device. The springs 35 always tend to force the two half portions of the device outwardly and thus separate them to the limit established by the edge to edge engagement of the lugs 28 and 32 indicated at 36 in Figure 4. It should be mentioned that in Figure 4 one of the springs 35 has been omitted from the disclosure for the purpose of clarity.

By virtue of the above description, it will be seen that the entire fabricated sealing device when finished is in the form of a unitary integral structure which may be handled and mounted in place as though it were but a single piece of material. Due to the interlocking engagement of the lugs on each of the half portions of the device, there is no danger of the device ever separating into its component parts unintentionally, and the device may be removed from operative position and provided with a new sealing boot 21, and then placed back into position.

When mounted around the shaft in operative position, as seen in Figure 1, the device is preferably placed under lateral or axial compression which will be against the action of the springs 35. The device is illustrated in Figure 3 under such compression, and it will be noted in the showing in this figure that the lugs 32 on the left hand part of the device are spaced away from the lugs 28 on the right hand part of the device while the springs 35 are under obvious compression. When mounted under such compression, the boot 21 not only provides a double edgewise sealing engagement with the shaft 1, but also provides a radial surface engagement with adjacent parts, in the illustrated instance these parts being the washer 20 and a radial surface of one of the bearings 2 or 3. Thus, lubricant cannot leak around the outer surface of the shaft, nor can the lubricant leak around the radial faces of the sealing device. There is, therefore, a positive seal that effectively retains lubricant on the inner side of the sealing device throughout very long operation of the particular mechanism with which the sealing device is associated.

As stated above, this invention also contemplates a novel method of making the sealing device. To this end, each half portion 23 and 24 of the device may be formed in a punch press or other suitable mechanism. However, on one of these half portions, and it may be either one, the circumferentially extending lugs forming the interlocking engagement are left in outwardly bent position. In the illustrated instance, I have selected the half 23 for this purpose, and with reference to Figure 5 it will be seen that initially the lugs 32 are left in outwardly inclined position as indicated by the dotted lines in this figure. This half portion 23 with the outwardly inclined lugs 32 is first put on a form shaft or arbor. The springs 35 are then held in position as the other half portion 24 is pushed on the same arbor and the respective solid body portions of both halves enter into the corresponding openings 27 and 31 in the opposite half portions. The lugs 32 are preferably outwardly inclined just sufficiently for the lugs 28 on the half portion 24 to pass by them. These lugs 28 are in true circumferential relationship with the remainder of the body portion 26.

When the parts are so mounted with the springs 35 in place, the parts are pressed axially toward each other sufficiently for the lugs 28 to pass the outwardly inclined lugs 32. When so positioned, the lugs 32 are then bent inwardly to the circumferential extending position in interlocking engagement with the lugs 28 on the opposite half portion. The form shaft or arbor forms a backing for this bending operation which may be done very simply and expeditiously, and the device is then securely held together. After this forming operation, the resilient boot 21 is placed in position, over the structure, and locked in place over the protruding studs 18 and 19.

From the foregoing, it is apparent that I have provided a novel and highly effective sealing device for retaining lubricant in its proper association with bearings and preventing the leaking of such lubricant from operating parts. The device is equally effective whether the shaft rotates relatively to the sealing device or not. It will be noted that the device provides a positive edgewise engagement with the shaft it surrounds in separate locations, which engagement is enhanced by the fact that the device is positioned under axial compression. Further, the device is simple in construction, economical to manufacture, highly durable, since it may be removed and replaced many times, and the device may be handled as a single piece structure thus facilitating its installation. It will also be noted that I have provided a novel method of making the device.

It will, of course, be understood that various details of construction may be varied through a wide range without departing from the principles of this invention, and it is, therefore, not the purpose to limit the patent granted hereon otherwise than necessitated by the scope of the appended claim.

I claim as my invention:

In an axially compressible sealing device for engagement around a shaft, a ring-like assembly including a pair of complemental confronting members, each member embodying a radially extending flange and a cylindrical shaft surrounding portion made up of spaced portions interdigitated with similar portions on the other member to prevent relative rotation between the members, resilient means between said members tending to force them apart, and interlocking circumferential flanges on said interdigitated portions to limit the action of said resilient means, studs projecting axially from the outer face of each of said radial flanges, and a resilient boot embracing the outer part of said assembly and snapped into engagement with said studs.

JOHN W. HOBBS.